US008373648B2

(12) United States Patent  (10) Patent No.: US 8,373,648 B2
Shih et al.  (45) Date of Patent: Feb. 12, 2013

(54) PROXIMITY SENSOR, CONTROL METHOD THEREOF, AND ELECTRONIC APPARATUS EQUIPPED WITH THE SAME

(75) Inventors: Cheng-Chung Shih, Fremont, CA (US); Yao-Tsung Tsai, San Jose, CA (US); Koon-Wing Tsang, Fremont, CA (US)

(73) Assignee: Capella Microsystems, Corp., Tortola (VG)

( * ) Notice: Subject to any disclaimer, the term of this patent is extended or adjusted under 35 U.S.C. 154(b) by 420 days.

(21) Appl. No.: 12/878,302

(22) Filed: Sep. 9, 2010

(65) Prior Publication Data

US 2012/0019149 A1    Jan. 26, 2012

(30) Foreign Application Priority Data

Jul. 23, 2010   (TW) ................................ 99124445 A (51) Int. Cl.
*G09G 3/36*        (2006.01)
(52) U.S. Cl. .......... 345/102; 345/82; 345/204; 345/212; 345/211
(58) Field of Classification Search ............. 340/539.23, 340/539.22, 539.1, 555, 561, 693.3; 345/102, 345/204, 211–214, 82, 76; 315/247, 224, 291, 149–159, 307–311, 312–326
See application file for complete search history.

(56) References Cited

U.S. PATENT DOCUMENTS 7,439,940 B1 *  10/2008  Maguire, Jr. ................. 345/7
2012/0232836 A1 *  9/2012  Ohmi ......................... 702/150

* cited by examiner

*Primary Examiner* — Tuyet Thi Vo
(74) *Attorney, Agent, or Firm* — WPAT, P.C.; Anthony King (57) ABSTRACT

A proximity sensor, a control method thereof and an electronic apparatus equipped with the proximity sensor are disclosed. The proximity sensor connected to a light-emitting module includes a light source, a light receiver and a control module. The light source emits lights at predetermined time intervals. The light receiver receives reflected lights of the emitted lights that are reflected from an object. The control module determines whether an average value of intensity values of the reflected lights is larger than a threshold value. If yes, the control module further determines whether a difference between a highest and a lowest intensity value of the reflected lights falls in a preset range. If yes, the control module would control the light-emitting module to change to a different light mode thereof. When a user reacts to the different light mode, the system will be able to tell whether a real user is present.

16 Claims, 6 Drawing Sheets

PROXIMITY SENSOR, CONTROL METHOD THEREOF, AND ELECTRONIC APPARATUS EQUIPPED WITH THE SAME

FIELD OF THE INVENTION

The present invention relates to an electronic apparatus, a proximity sensor, and a control method of the proximity sensor; and more particularly to an electronic apparatus, a proximity sensor, and a control method of the proximity sensor that are capable of correctly determining a current state of using of the electronic apparatus by a user.

BACKGROUND OF THE INVENTION

Recently, the use of a proximity sensor has gradually become a main technical trend among the new generation of multifunctional mobile phones. When a mobile phone equipped with a proximity sensor is positioned near a user's ear to actuate a face detection function or is placed in the user's pocket, the proximity sensor is able to immediately turn off the screen of the mobile phone, so as to save the power consumption of the mobile phone and to protect a touch-screen thereof, if any, from unexpected touch or function activation. When a user approaches the mobile phone under a hand-free talking mode to the user's ear, the proximity sensor is able to immediately switch the phone from the hand-free talking mode to a normal mode, so as to make the phone more convenient for use.

The proximity sensor provides not only a smart detection function, but also additional benefit of saving power consumption, and therefore has become many mobile phone manufacturers' best choice. With the benefit of saving power consumption provided by the proximity sensor, consumers using electronic devices equipped with a proximity sensor can enjoy more fun from the extended working hours of the electronic devices. For example, users can play video games, watch video programs, listen to music files, browse websites over Internet, and use many other functions integrated into the electronic devices without being frequently interrupted by short working hours of the electronic devices. When a mobile phone is not in use, the proximity sensor thereof can also, for example, immediately shut off the display screen and/or the keyboard function of the mobile phone. The proximity sensor can also be used to detect whether the cover of a flip-top mobile phone is in a lifted or a closed position.

When being applied to the personal computer, the notebook computer and other peripherals, the proximity sensor can detect surrounding brightness to enable the keyboard backlight or the screen power supply of the computer or the peripherals to be automatically turned on in a dark environment. The proximity sensor enables the provision of a smart keyboard design. That is, when a user moves away from the keyboard, the keyboard backlight or the screen power supply would be automatically shut off to enable to extend battery working hours and computer displayed information to be viewed by unrelated person. Further, when the user does not present in front of the computer, the proximity sensor enables the screen and the computer to automatically shut off and enter into a power-saving standby mode.

However, when the user moves away from a screen or a lamp equipped with a proximity sensor and pushes a chair toward the desk with the computer positioned thereon or put a book or a cup in front of the proximity sensor, or a cat lies down to sleep on the desk in front of the proximity sensor, the proximity sensor would make incorrect determination that the user is still sit before the screen or the lamp, and therefore keeps the screen or the lamp in the on state to cause unnecessary waste of electric energy. Or, it is possible a user watching TV does not move his or her body for quite a long time. In this case, the proximity sensor would not be able to determine whether the user is still sitting before the TV simply by detecting any existence or movement of any object in front of the proximity sensor. That is, it is possible the proximity sensor wrongly determines the user has already moved away from the TV screen and therefore turns off the TV. Such wrong determination surely would bring confusion or inconvenience to the user.

SUMMARY OF THE INVENTION

A primary object of the present invention is to provide an electronic apparatus, a proximity sensor, and a control method of the proximity sensor, so as to overcome the problem of prior art proximity sensors as having low accuracy in determining whether a user has indeed moved away from an electronic apparatus and the electronic apparatus is currently not in use.

To achieve the above and other objects, the proximity sensor according to the present invention is connected to a light-emitting module, and includes a light source, a light receiver, and a control module. The light source emits lights at predetermined time intervals. The light receiver receives reflected lights of the emitted lights of the light source that are reflected from an object. The control module determines whether an average value of a plurality of intensity values of the reflected lights is larger than a threshold value. In the case the average value is larger than the threshold value, it is then further determined by the control module whether a difference between a highest and a lowest intensity value of the reflected lights falls in a preset range. In the case the difference falls in the preset range, the control module would then control the light-emitting module to change to a different lighting mode thereof.

Alternatively, in the case the average value is smaller than the threshold value, the control module would then control the light-emitting module to stop emitting light.

Preferably, the lighting mode of the light-emitting module is selected from the group consisting of a full lighting mode, a partial lighting mode, an intermittent lighting mode, and a full dark mode.

Alternatively, in the case the difference falls out of the preset range, the control module does not change the present lighting mode of the light-emitting module.

Preferably, the light source emits invisible lights.

To achieve the above and other objects, the control method of the proximity sensor according to the present invention is applicable to a proximity sensor that is connected to a light-emitting module and includes a light source, a light receiver, and a control module. The control method includes the following steps: causing the light source to emit lights at predetermined time intervals; using the light receiver to receive reflected lights of the emitted light from the light source that are reflected from an object; and using the control module to determine whether an average value of a plurality of intensity values of the reflected lights is larger than a threshold value; in the case the average value being larger than the threshold value, using the control module to further determine whether a difference between a highest and a lowest intensity value of the reflected lights falls in a preset range; and in the case the difference falling in the preset range, using the control module to control the light-emitting module to change to a different lighting mode thereof.

The control method further includes a step of using the control module to control the light-emitting module to stop emitting light in the case the average value is smaller than the threshold value.

In the control method, the light mode of the light-emitting module is selected from the group consisting of a full lighting mode, a partial lighting mode, an intermittent lighting mode, and a full dark mode.

The control method further includes a step of using the control module to keep the present lighting mode of the light-emitting module in the case the difference falls out of the preset range.

In the control method, the light source emits invisible lights.

To achieve the above and other objects, the electronic apparatus according to the present invention includes at least a light-emitting module and a proximity sensor. The proximity sensor includes a light source, a light receiver, and a control module. The light source emits lights at predetermined time intervals. The light receiver receives reflected lights of the emitted lights of the light source that are reflected from an object. The control module determines whether an average value of a plurality of intensity values of the reflected lights is larger than a threshold value. In the case the average value is larger than the threshold value, it is further determined by the control module whether a difference between a highest and a lowest intensity value of the reflected lights falls in a preset range. In the case the difference falls in the preset range, the control module would then control the light-emitting module to change to a different lighting mode thereof.

Alternatively, in the case the average value is smaller than the threshold value, the control module would then control the light-emitting module to stop emitting light.

Preferably, the lighting mode of the light-emitting module is selected from the group consisting of a full lighting mode, a partial lighting mode, an intermittent lighting mode, and a full dark mode.

Alternatively, in the case the difference falls out of the preset range, the control module does not change the present lighting mode of the light-emitting module.

Preferably, the light source emits invisible lights.

In the present invention, the electronic apparatus can be any one of a desktop personal computer, a notebook computer, a mobile phone, a smart mobile phone, a PDA, a navigation system, a display, a projector, and a lighting device.

With the above arrangements, the electronic apparatus, the proximity sensor, and the control method of the proximity sensor according to the present invention have one or more of the following advantages:

(1) The proximity sensor, the electronic apparatus equipped with the proximity sensor, and the control method of the proximity sensor are able to determine whether a user has moved away from the electronic apparatus by detecting whether the change in the intensity values of the reflected lights within a preset time period falls out of a preset range, and a warning is given when the change in the intensity values of the received reflected lights within the preset time period falls out of the preset range. In this manner, it is able to increase the sensing or detection accuracy of the proximity sensor.

(2) The proximity sensor, the electronic apparatus equipped with the proximity sensor, and the control method of the proximity sensor can verify whether the user has indeed moved away from the electronic apparatus by changing the brightness level or the lighting mode of the electronic apparatus. Thus, the problem of making an incorrect determination on the user's movement relative to the electronic apparatus as found in the conventional proximity sensor can be avoided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
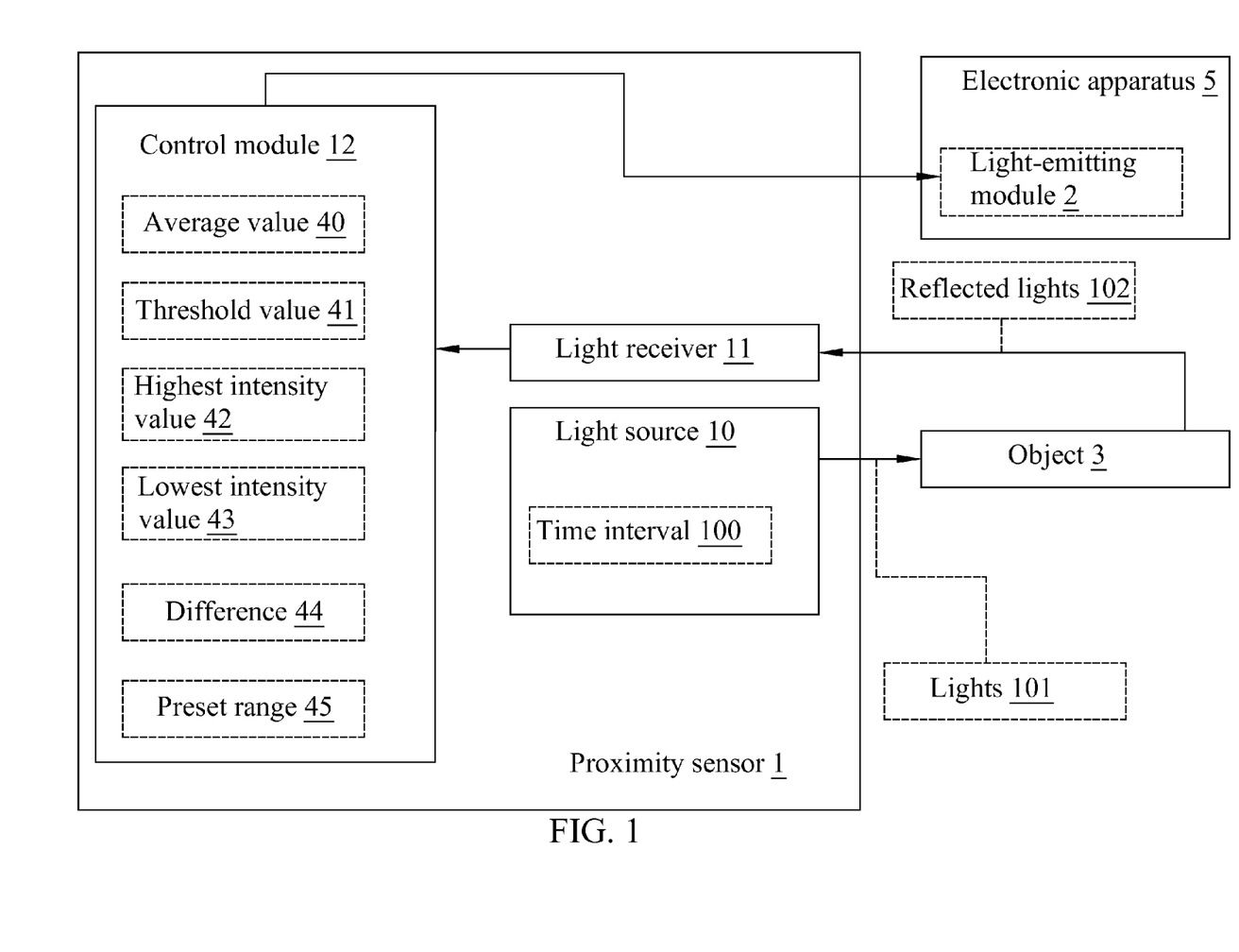
FIG. 1 is a block diagram of a proximity sensor according to the present invention.

Please refer to FIG. 1 that is a block diagram of a proximity sensor 1 according to the present invention. As shown, the proximity sensor 1 is connected to a light-emitting module 2 provided on an electronic apparatus 5. The proximity sensor 1 includes a light source 10, a light receiver 11, and a control module 12. The light source 10 emits lights 101 at predetermined time intervals 100. The emitted lights 101 are reflected by an object 3 to produce reflected lights 102, which are received by the light receiver 11. The control module 12 determines whether an average value 40 of a plurality of intensity values of the reflected lights 102 is larger than a threshold value 41 or not. In the case the average value 40 is larger than the threshold value 41, the control module 12 further determines whether a difference 44 between a highest intensity value 42 and a lowest intensity value 43 of the reflected lights 102 falls in a preset range 45. In the case the difference 44 falls in the preset range 45, the control module 12 would then control the light-emitting module 2 to change to a different lighting mode thereof.

In some preferred embodiments of the present invention, the light-emitting module 2 provides some different lighting modes, including, for example, a full lighting mode, a partial lighting mode, an intermittent lighting mode, and a full dark mode. In the case the average value 40 is smaller than the threshold value 41, the control module 12 would then control the light-emitting module 2 to stop emitting light. And, in the case the difference 44 falls out of the preset range 45, the control module 12 would not change the present lighting mode of the light-emitting module 2. The light source 10 can emit visible light or invisible light. In the case of invisible light, it can be infrared light.

Figure 2:
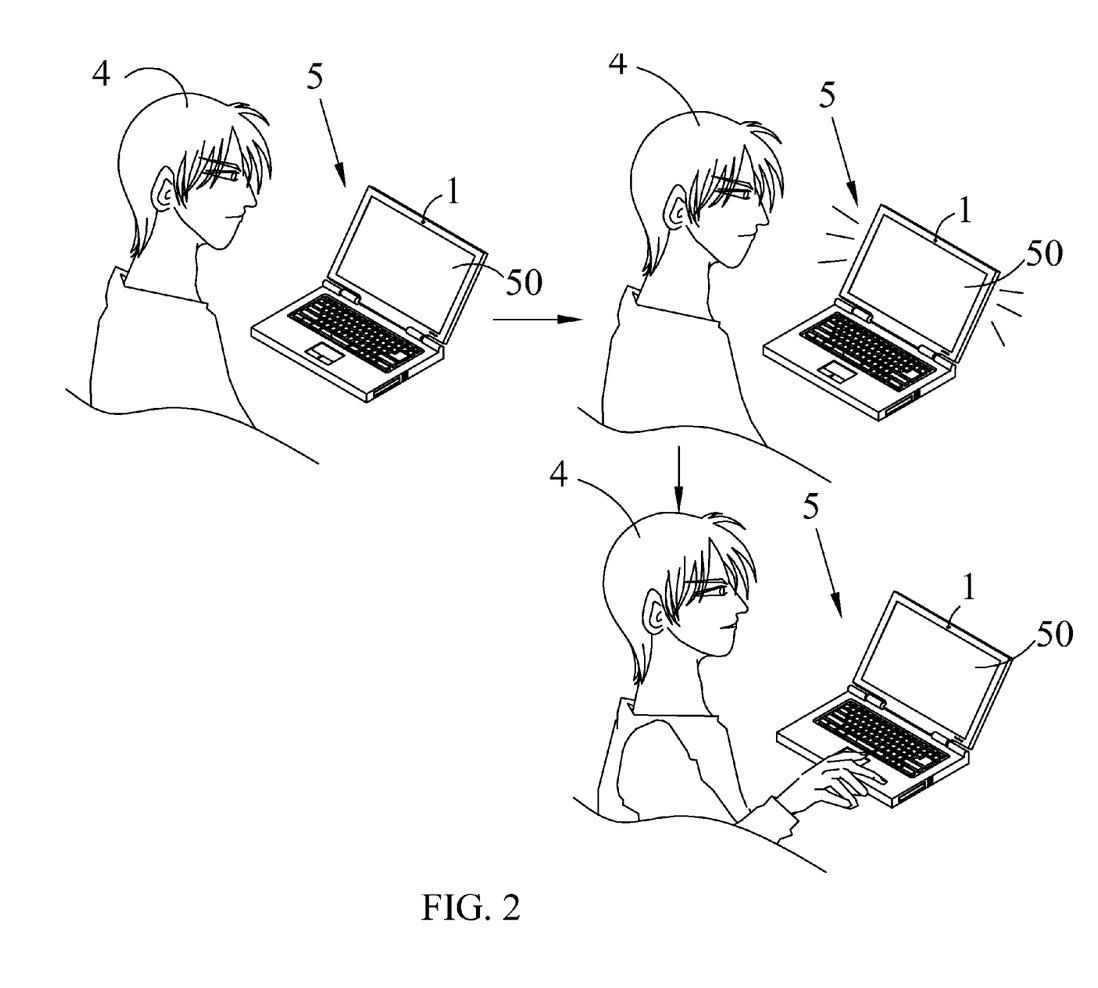
FIG. 2 shows the operation of the proximity sensor of the present invention in a first example of application thereof.

Please refer to FIG. 2 that shows the operation of the proximity sensor of the present invention in a first example of application thereof. As shown, a user 4 is using an electronic apparatus 5 equipped with the proximity sensor 1 of the present invention. In the illustrated first example of application, the electronic apparatus 5 is a notebook computer, which includes a screen 50 having a backlight module functioning like a light-emitting module. The light source of the proximity sensor 1 constantly emits lights at predetermined time intervals, such as emits lights at every 0.1 second. The time interval can be differently set according to actual need. The emitted lights of the light source are reflected from the user 4 to produce reflected lights, which are continuously received by the light receiver of the proximity sensor 1. In the case an average value of the intensity values of, for example, 50 reflected lights received by the light receiver of the proximity sensor 1 keeps being larger than a threshold value of 3, for example, the control module of the proximity sensor 1 would, in addition to controlling the screen 50 of the electronic apparatus 5 to display in the full lighting mode, further determine whether the difference between the highest intensity value and the lowest intensity value of the reflected lights falls in a preset range. For instance, the highest intensity value is 6, the lowest intensity value is 4, and the difference between these two values is 3; and the preset range can be between 1 and 3. In the above case, since the difference falls in the preset range between 1 and 3, the control module would determine the user 4 in front of the electronic apparatus 5 might have already moved away from the electronic apparatus 5 but there is still an unidentified object located in front of the electronic apparatus 5. At this point, the proximity sensor 1 could control the screen 50 to change to a different lighting mode. For example, the proximity sensor 1 could control the screen 50 to light intermittently (i.e. to flash) or to lower the brightness level thereof by a certain degree, such as one half, one third, or a quarter of the original brightness level. In the case the user 4 is still sitting before the screen 50 to use the electronic apparatus 5, the user 4 would instinctively do something, such as raises his head or moves his body, in response to the flashing or darkened screen 50. As a result of such instinctive movement of the user's, the difference between the highest and the lowest intensity value of the reflected lights received by the light receiver of the proximity sensor 1 would change. For example, the highest intensity value is 8, the lowest intensity value is 4, and the difference between the two intensity values is now 5. In this case, the difference becomes higher and falls out of the preset range between 1 and 3, and the proximity sensor 1 would determine that the user 4 is still sitting before the electronic apparatus 5 without moving away from the same, and then controls the screen 50 to change to the full lighting mode, allowing the user 4 to continue his work with the electronic apparatus 5.

Figure 3:
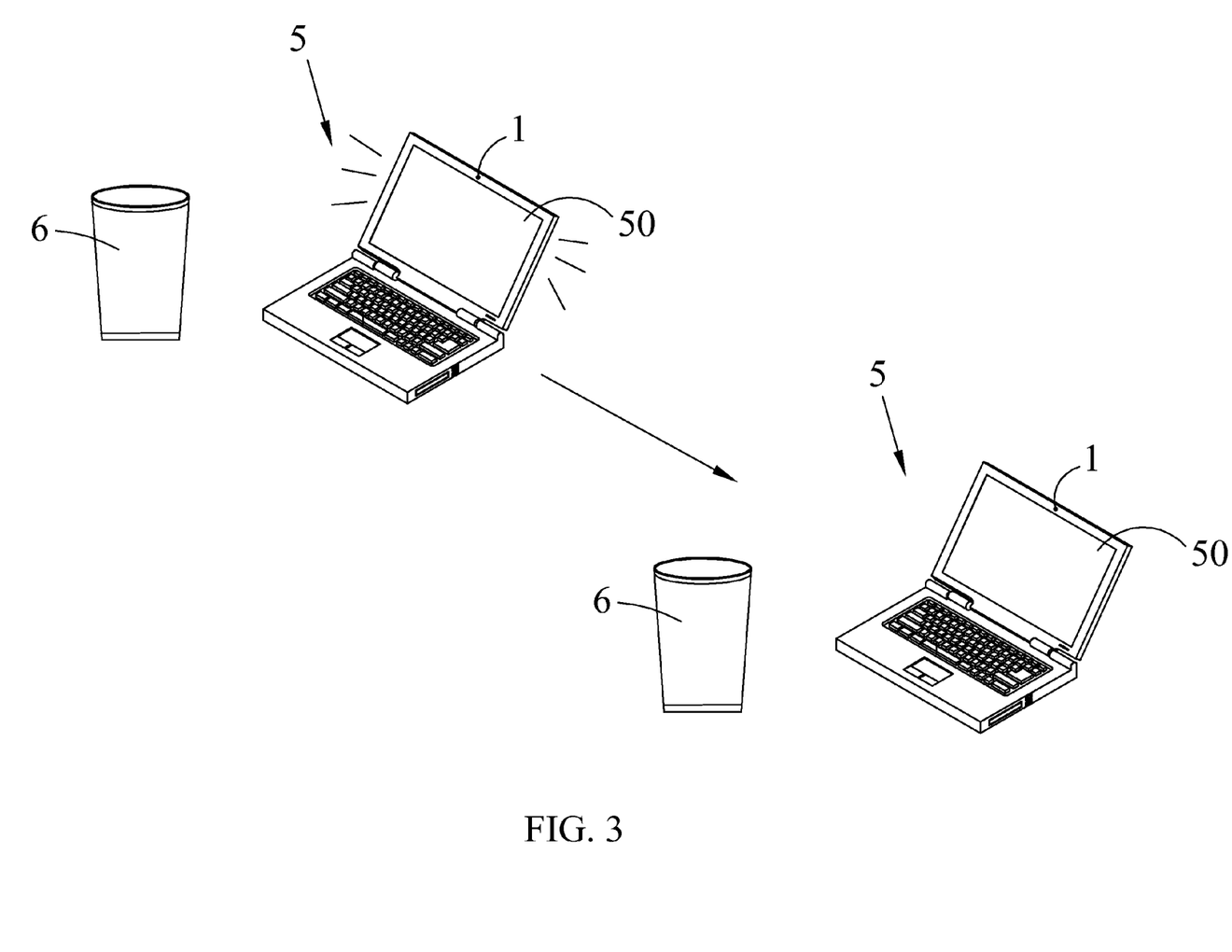
FIG. 3 shows another operation of the proximity sensor of the present invention in the first example of application thereof.

FIG. 3 shows another operation of the proximity sensor 1 of the present invention in the first example of application thereof. As shown, when the user 4 moves away from the electronic apparatus 5 with a cup 6 placed in front of the electronic apparatus 5, the proximity sensor 1 can still sense the reflected lights having an average intensity value larger than the threshold value and would still control the screen 50 to the full lighting mode. However, when the control module of the proximity sensor 1 follows the same control principle to control the screen 50 to flash or to lower the brightness level thereof, the cup 6 would not move in response to the change in the screen 50, and the difference between the highest and the lowest intensity value of the reflected lights received by the light receiver of the proximity sensor 1 keeps unchanged. In the case the difference between the highest and the lowest intensity value of the reflected lights keeps falling in the preset range after the screen 50 has been controlled by the proximity sensor 1 to flash or lower the brightness level thereof for a preset time period, the proximity sensor 1 would then determine the user 4 has moved away from the front of the electronic apparatus 5 and therefore controls the screen 50 to shut off for the purpose of saving power consumption of the electronic apparatus 5.

The electronic apparatus 5 can be a desktop personal computer, a tablet computer, a mobile phone, a smart mobile phone, a personal digital assistant (PDA), a navigation system, a display, a projector, or a lighting device.

Figure 4:
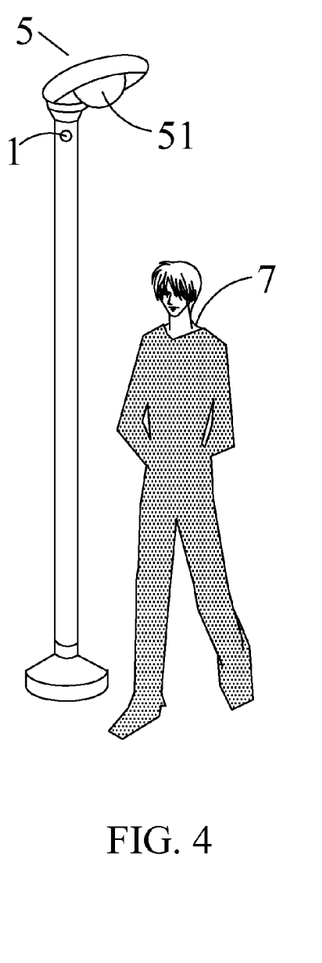
FIG. 4 shows the operation of the proximity sensor of the present invention in a second example of application thereof.

Please refer to FIG. 4 that shows the operation of the proximity sensor of the present invention in a second example of application thereof. In the second example of application, the electronic apparatus 5 equipped with the proximity sensor 1 of the present invention is a street lamp 51, which also serves as a light-emitting module. As shown, when a person 7 strolls to and fro under the street lamp 51, the proximity sensor 1 would continuously receive the reflected lights having an average light intensity value higher than the threshold value. Meanwhile, the difference between the highest and the lowest intensity values of the reflected lights would fall out of the preset range because the person 7 keeps strolling to and fro under the street lamp 51. Therefore, the control module of the proximity sensor 1 controls the street lamp 51 to emit light continuously and does not change the present full lighting mode of the street lamp 51.

Figure 5:
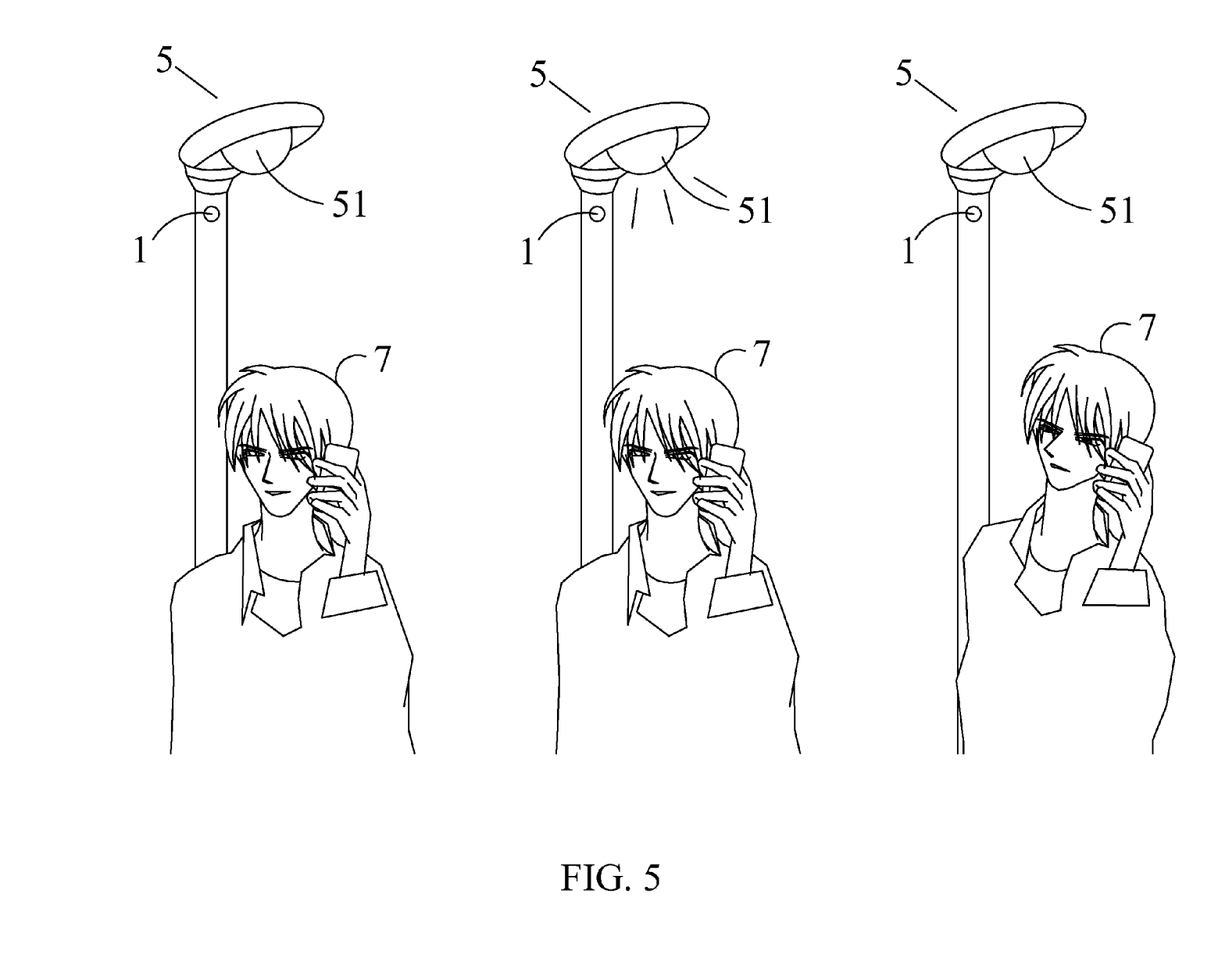
FIG. 5 shows another operation of the proximity sensor of the present invention in the second example of application thereof.

Please refer to FIG. 5 that shows another operation of the proximity sensor 1 of the present invention in the second example of application thereof. For example, when the person 7 stops strolling and stands still under the street lamp 51 to answer an incoming call, the proximity sensor 1 can still sense an average reflected light intensity higher than the threshold and therefore controls the street lamp 51 to the full lighting mode. However, when the person 7 keeps standing still under the street lamp 51, and the difference between the highest and the lowest reflected light intensity values becomes fallen in the preset range, the control module of the proximity sensor 1 would determine that the person 7 under the electronic apparatus 5 might have already moved away from the street lamp 51 but there is still an unidentified object located below the street lamp 51. In this case, the proximity sensor 1 would control the street lamp 51 to change to a different lighting mode, such as controls the street lamp 51 to light intermittently or to light at a reduced brightness level. In the event the person 7 raises his head or moves his body as an instinctive response to the change in the brightness of the street lamp 51, the difference between the highest and the lowest intensity value of the reflected lights received by the light receiver of the proximity sensor 1 would change accordingly. In the case the difference falls out of the preset range, the proximity sensor 1 of the present invention would then determine that the person 7 is still standing under the electronic apparatus 5 without moving away therefrom, and controls the street lamp 51 to change back to the full lighting mode, so that the person 7 can still stand in a relatively bright environment. The above two examples of applications can be differently combined and utilized to effectively achieve the purpose of saving power consumption of the electronic apparatus 5.

The above description of the proximity sensor of the present invention also gives an idea about a control method thereof. Nevertheless, for the purpose of clarity, a more detailed description of the control method of the proximity sensor of the present invention will now be provided with reference to FIG. 6.

Figure 6:
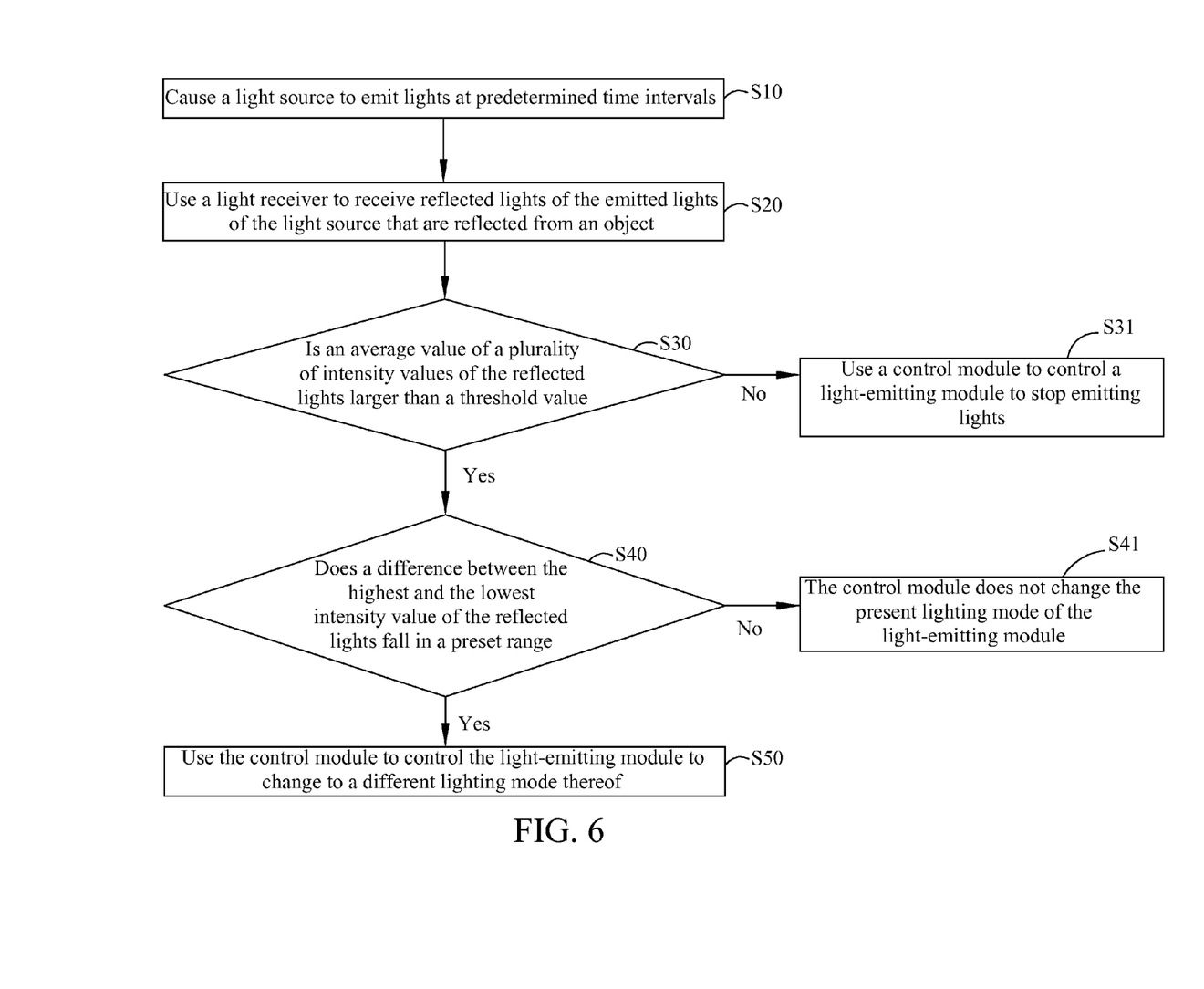
FIG. 6 is a flowchart showing the steps included in a control method of the proximity sensor of the present invention.

FIG. 6 is a flowchart showing the steps included in the control method of the proximity sensor of the present invention. As shown, the control method is applicable to a proximity sensor, which includes a light source, a light receiver, and a control module, and the proximity sensor is connected to a light-emitting module. The control method includes the steps of:

causing the light source to emit lights at predetermined time intervals (S10);

using the light receiver to receive reflected lights of the emitted lights of the light source that are reflected from an object (S20);

using the control module to determine whether an average value of a plurality of intensity values of the reflected lights is larger than a threshold value or not (S30);

in the case the average value being larger than the threshold value, using the control module to further determine whether a difference between a highest and a lowest intensity value of the reflected lights falls in a preset range (S40); and     in the case the difference falling in the preset range, using the control module to control the light-emitting module to change to a different light mode thereof (S50).

In the above control method, a step S31 of using the control module to control the light-emitting module to stop emitting light is further included after the step S30 if it is determined in the step S30 that the average value is smaller than the threshold value; and a step S41 of using the control module to control the light-emitting module to keep the same lighting mode is further included after the step S40 if it is determine in the step S40 that the difference does not fall in the preset range.

In brief, with the proximity sensor, the electronic apparatus equipped with the proximity sensor, and the control method of the proximity sensor according to the present invention, it is able to determine whether a user has moved away from the electronic apparatus by detecting whether the change in the intensity values of the received reflected lights within a preset time period falls out of a preset range. In this manner, it is able to increase the sensing or detection accuracy of the proximity sensor. Further, with the present invention, different ways of warning, such as changing the brightness level or the lighting mode of the electronic apparatus, can be provided to verify whether the user has indeed moved away from the electronic apparatus. Thus, the problem of making an incorrect determination on the user's presence in front of the electronic apparatus as found in the conventional proximity sensor can be avoided.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A proximity sensor being connected to a light-emitting module, comprising:

a light source for emitting lights at predetermined time intervals;

a light receiver for receiving reflected lights of the emitted lights of the light source that are reflected from an object; and     a control module for determining whether an average value of a plurality of intensity values of the reflected lights is larger than a threshold value; in the case the average value being larger than the threshold value, the control module further determining whether a difference between a highest and a lowest intensity value of the reflected lights falls in a preset range; and in the case the difference falling in the preset range, the control module then controlling the light-emitting module to change to a different lighting mode thereof.

2. The proximity sensor as claimed in claim 1, wherein, in the case the average value is smaller than the threshold value, the control module controls the light-emitting module to stop emitting light.

3. The proximity sensor as claimed in claim 1, wherein the lighting mode of the light-emitting module is selected from the group consisting of a full lighting mode, a partial lighting mode, an intermittent lighting mode, and a full dark mode.

4. The proximity sensor as claimed in claim 3, wherein, in the case the difference falls out of the preset range, the control module does not change the lighting mode of the light-emitting module.

5. The proximity sensor as claimed in claim 1, wherein the light source emits invisible lights.

6. A control method of a proximity sensor, the proximity sensor including a light source, a light receiver and a control module and being connected to a light-emitting module, comprising the following steps:

causing the light source to emit lights at predetermined time intervals;

using the light receiver to receive reflected lights of the emitted lights of the light source that are reflected from an object;

using the control module to determine whether an average value of a plurality of intensity values of the reflected lights is larger than a threshold value;

in the case the average value being larger than the threshold value, using the control module to further determine whether a difference between a highest and a lowest intensity value of the reflected lights falls in a preset range; and     in the case the difference falling in the preset range, using the control module to control the light-emitting module to change to a different lighting mode thereof.

7. The control method of a proximity sensor as claimed in claim 6, further comprising a step of using the control module to control the light-emitting module to stop emitting light when it is determined the average value is smaller than the threshold value.

8. The control method of a proximity sensor as claimed in claim 6, wherein the lighting mode of the light-emitting module is selected from the group consisting of a full lighting mode, a partial lighting mode, an intermittent lighting mode, and a full dark mode.

9. The control method of a proximity sensor as claimed in claim 8, further comprising a step of using the control module to control the light-emitting module to keep the same lighting mode when it is determined the difference falls out of the preset range.

10. The control method of a proximity sensor as claimed in claim 6, wherein the light source emits invisible lights.

11. An electronic apparatus, comprising:

a light-emitting module for emitting visible light; and a proximity sensor being connected to the light-emitting module, and including:

a light source for emitting lights at predetermined time intervals;

a light receiver for receiving reflected lights of the emitted lights of the light source that are reflected from an object; and         a control module for determining whether an average value of a plurality of intensity values of the reflected lights is larger than a threshold value; in the case the average value being larger than the threshold value, the control module further determining whether a difference between a highest and a lowest intensity value of the reflected lights falls in a preset range; and in the case the difference falling in the preset range, the control module controlling the light-emitting module to change to a different light mode thereof.

12. The electronic apparatus as claimed in claim 11, wherein, in the case the average value is smaller than the threshold value, the control module controls the light-emitting module to stop emitting light.

13. The electronic apparatus as claimed in claim 11, wherein the lighting mode of the light-emitting module is selected from the group consisting of a full lighting mode, a partial lighting mode, an intermittent lighting mode, and a full dark mode.

14. The electronic apparatus as claimed in claim 13, wherein, in the case the difference falls out of the preset range, the control module does not change the lighting mode of the light-emitting module.

15. The electronic apparatus as claimed in claim 11, wherein the light source emits invisible lights.

16. The electronic apparatus as claimed in claim 11, wherein the electronic apparatus is selected from the group consisting of a desktop personal computer, a notebook computer, a mobile phone, a smart mobile phone, a PDA, a navigation system, a display, a projector, and a lighting device.

* * * * *